(12) United States Patent
Biswas et al.

(10) Patent No.: US 12,450,806 B2
(45) Date of Patent: Oct. 21, 2025

(54) SYSTEM AND METHOD FOR GENERATING EMOTIONALLY-AWARE VIRTUAL FACIAL EXPRESSIONS

(71) Applicant: VERIZON PATENT AND LICENSING INC., Basking Ridge, NJ (US)

(72) Inventors: Subham Biswas, Maharashtra (IN); Saurabh Tahiliani, Uttar Pradesh (IN)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 31 days.

(21) Appl. No.: 17/873,437

(22) Filed: Jul. 26, 2022

(65) Prior Publication Data

US 2024/0037824 A1 Feb. 1, 2024

(51) Int. Cl.
G06T 13/00 (2011.01)
G06F 40/20 (2020.01)
G10L 15/16 (2006.01)
G10L 15/22 (2006.01)
G10L 25/63 (2013.01)

(52) U.S. Cl.
CPC .............. *G06T 13/00* (2013.01); *G06F 40/20* (2020.01); *G10L 15/16* (2013.01); *G10L 15/22* (2013.01); *G10L 25/63* (2013.01)

(58) Field of Classification Search
CPC ......... G06T 13/00; G06F 40/20; G10L 15/16; G10L 15/22; G10L 25/63
See application file for complete search history.

(56) References Cited

U.S. PATENT DOCUMENTS

| | | | |
|---|---|---|---|
| 10,204,625 B2 * | 2/2019 | Mishra | G10L 15/1807 |
| 11,462,207 B1 * | 10/2022 | Tao | G10L 25/30 |
| 11,749,279 B2 * | 9/2023 | Gharpure | G06F 3/167 |
| | | | 704/275 |
| 11,756,244 B1 * | 9/2023 | Bhunia | G06V 30/22 |
| | | | 715/268 |
| 11,816,434 B2 * | 11/2023 | Williams | G06F 16/3344 |
| 2017/0352361 A1 * | 12/2017 | Thörn | G11B 27/031 |
| 2018/0136615 A1 * | 5/2018 | Kim | G06N 3/08 |
| 2019/0045270 A1 * | 2/2019 | Vats | H04L 51/02 |
| 2020/0051583 A1 * | 2/2020 | Wu | G10L 13/047 |
| 2020/0410739 A1 * | 12/2020 | Shin | G06V 10/764 |
| 2021/0004543 A1 * | 1/2021 | Kobayashi | G10L 15/02 |
| 2022/0137992 A1 * | 5/2022 | Arth | G06F 9/453 |
| | | | 705/2 |

(Continued)

FOREIGN PATENT DOCUMENTS

CN 114091930 A * 2/2022

*Primary Examiner* — Abderrahim Merouan

(57) ABSTRACT

Techniques for generating emotionally-aware digital content are disclosed. In one embodiment, a method is disclosed comprising obtaining audio input, obtaining a textual representation of the audio input; using the textual representation of the audio input to identify an emotion corresponding to the audio input; generating an emotionally-aware facial representation in accordance with the textual representation and the identified emotion; using the emotionally-aware facial representation to generate one or more images comprising at least one facial expression corresponding to the identified emotion; and providing digital content comprising the one or more images.

18 Claims, 8 Drawing Sheets

(56) References Cited

U.S. PATENT DOCUMENTS

| | | | |
|---|---|---|---|
| 2022/0139376 A1* | 5/2022 | Buesser | H04L 67/306 |
| | | | 704/275 |
| 2022/0171960 A1* | 6/2022 | Nelson | A63F 13/57 |
| 2023/0169990 A1* | 6/2023 | Biswas | G10L 25/63 |
| | | | 704/270 |
| 2023/0237417 A1* | 7/2023 | Kumar | G06Q 10/06398 |
| | | | 705/7.42 |
| 2023/0260536 A1* | 8/2023 | Xu | G10L 25/63 |
| | | | 704/231 |
| 2023/0360437 A1* | 11/2023 | Shin | G06T 7/10 |
| 2024/0037824 A1* | 2/2024 | Biswas | G06T 13/40 |

* cited by examiner

200

TEXTUAL REPRESENTATION 108 — I AM SORRY TO HEAR THAT. LET ME HELP YOU FIX THIS.

EMOTION 112 — PACIFYING

PHONEMIC REPRESENTATION 116 — AɪÆM ˈSɑRI TU HIR ÐÆT. LƐT MI HƐLP JU FɪKS ÐɪS.

Figure 2

SYSTEM AND METHOD FOR GENERATING EMOTIONALLY-AWARE VIRTUAL FACIAL EXPRESSIONS

BACKGROUND INFORMATION

Various software applications use or generate facial images. An avatar in a gaming application can have a face, for example. Another example of an application that can use or generate a facial image is an automated interactive response application to interact both visually and audibly in a dialog with a user. Some examples of automated interactive response applications include customer service, technical support applications and the like, however, such facial images are limited.

BRIEF DESCRIPTION OF THE DRAWINGS

FIG. 2 provides an exemplary illustration of textual and phonemic representations corresponding to audio input in accordance with one or more embodiments of the present disclosure;

DETAILED DESCRIPTION

The disclosed embodiments can be used in dynamically formulating emotionally-aware digital content comprising emotionally-aware facial expressions. Embodiments of the present disclosure can be used to incorporate one or more facial expressions corresponding to an identified emotion into a depiction of a face, such as a facial image, in digital content. Embodiments of the present disclosure can be used to identify an emotion, a corresponding set of facial expressions and an image, which can be, or include a depiction of a face including the set of facial expressions.

By way of some non-limiting examples, a facial image can be a digitally-generated facial image or an image of an actual face. By way of a further non-limiting example, embodiments of the present disclosure can be used to incorporate a facial expression into the face of a person, avatar, animated character, etc. depicted in digital content. Embodiments of the present disclosure can be used with a gaming application, an automated interactive response application (e.g., a customer service, technical support, or the like application), or any software application to generate facial images with emotionally-aware facial expressions.

In accordance with one or more embodiments of the present application, digital content comprising an audio portion (e.g., a sound, phrase, word, sentence, etc.) can be used to identify an emotion and determine a set of facial expressions that express the identified emotion. The set of facial expressions can be incorporated into a facial image. In accordance with one or more embodiments, the digital content can comprise both the audio input and a video portion (e.g., an image) comprising the facial image, which is modified to include the set of facial expressions corresponding to the emotion identified using the audio portion. By way of a non-limiting example, an "anger" emotion can be associated with a set of facial expressions including raised eyebrow(s), pulled up eyelids, tightened lips or the like. Using this example to further illustrate, anger can be identified in the audio input (e.g., a sound, phrase, word, sentence, etc.) as an emotion being expressed, and a facial image corresponding to the audio input (e.g., the video component corresponding to the audio input) can be modified to include the set of facial expressions associated with anger. In accordance with one or more embodiments, the facial expression can be output as an image, as a frame of digital content comprising the audio input and the modified video component.

Figure 1:
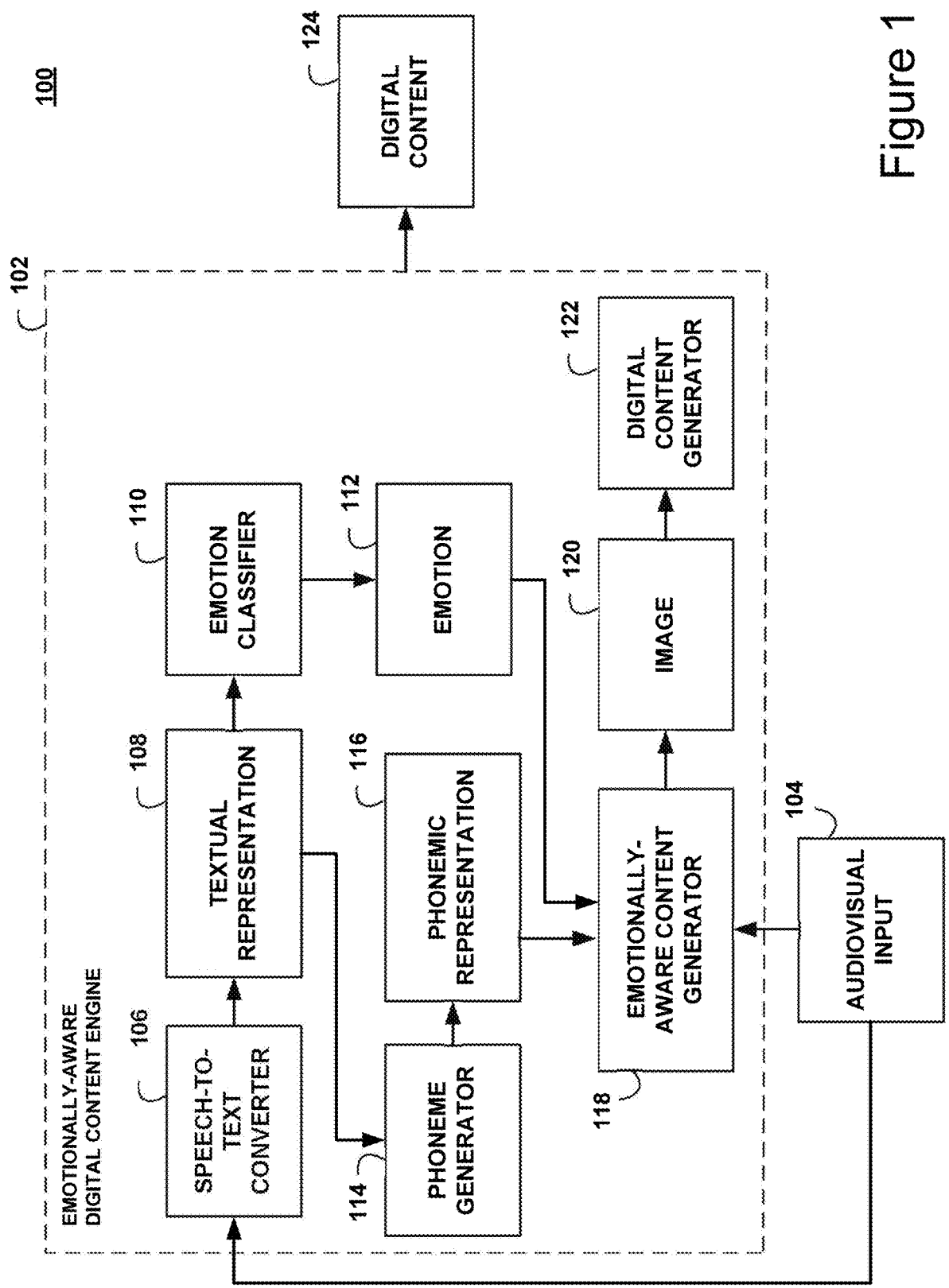
FIG. 1 provides an example illustrating an emotionally-aware digital content engine for use in generating emotionally-aware digital content in accordance with one or more embodiments of the present disclosure.

FIG. 1 provides an example illustrating an emotionally-aware digital content engine for use in generating emotionally-aware digital content in accordance with one or more embodiments of the present disclosure. In example 100 of FIG. 1, emotionally-aware digital content engine 102 comprises a speech-to-text converter 106, emotion classifier 110, phoneme generator 114, emotionally-aware content generator 118 and digital content generator 122.

In accordance with one or more embodiments, emotionally-aware digital content engine 102 can be used with audiovisual input 104 to generate image 120, which can be, or include, a depiction of a face including a set of facial expressions (comprising one or more facial expressions) corresponding to emotion 112. In accordance with one or more embodiments, image 120 comprises a matrix of pixels, each of which is defined by one or more values (e.g., intensity values, color values, etc.).

In example 100, audiovisual input 104, which can be received by emotionally-aware digital content engine 102, can be digital content comprising a number of frames, each frame comprising an audio component and a corresponding image. By way of a non-limiting example, each frame can comprise an image of a face, or facial image. The facial image can be (but need not be) part of an image of a figure, character, etc. depicted in the frame. By way of a further non-limiting example, the audio component can one or more words, sounds, utterances, etc. spoken by the figure, character, etc. depicted in the image component.

Speech-to-text converter 106 can be configured to extract the audio of the audiovisual input 104 and convert the extracted audio to textual representation 108. Speech-to-text converter 106 can comprise for example a conversion tool provided by Google Cloud, speechtexter.com, Microsoft® Azure, or the like. The textual representation 108 (of the extracted audio of audiovisual input 104) generated by speech-to-text converter 106 can be used by a number of components of emotionally-aware digital content engine 102, as is discussed in more detail below.

In accordance with one or more embodiments, the textual representation 108 of audio from input 104 can be used by emotion classifier 110 to identify an emotion (e.g., emotion 112) corresponding to the audio. Emotion classifier 110 can be trained using a machine learning algorithm and a number of training samples. Each training example can comprise a textual representation of an audio sample and a designated emotion as a label. The textual representation 108 of the audio extracted from input 104 can be used as input to a trained emotion classifier 110 to obtain emotion 112 corresponding to the audio extracted from input 104.

In accordance with one or more embodiments, textual representation 108 can be used by phoneme generator 114 to generate a phonemic representation 116 of the audio extracted from input 104. By way of a non-limiting example, phoneme generator 114 can use textual representation 108 to generate phonemic representation 116.

In accordance with one or more embodiments, a phonemizer can be used by phoneme generator 114 to generate the phonemic representation 116 using the textual representation 108. By way of some non-limiting examples, a phonemizer can be a language transcription tool such as Epitran® provided by the Python® Software Foundation, Phonemizer® available at GitHub®, the online converter available at to Phonetics®, or the like.

In accordance with one or more embodiments, phonemic representation 116 comprises a number of phonemes corresponding to textual representation 108. A phoneme refers to a phonetic unit of sound in a language. The phonemic representation 116 can be a phonetic transcription (or textual representation) of the speech sounds (or phones represented as symbols) of textual representation 108. By way of a non-limiting example, the symbols can be symbols used in a phonetic alphabet, such as the International Phonetic Alphabet (IPA).

FIG. 2 provides an exemplary illustration of textual and phonemic representations corresponding to audio input in accordance with one or more embodiments of the present disclosure. In example 200 of FIG. 2, textual representation 108 is an example of a textual representation generated by speech-to-text converter 106. As discussed, in accordance with one or more embodiments, textual representation 108 can be used by emotion classifier 110 to identify emotion 112 (e.g., pacifying), and by phoneme generator 114 to generate phonemic representation 116.

Referring again to FIG. 1, emotion 112 and phonemic representation 116 can be used by emotionally-aware content generator 118 to generate image 120. As discussed, image 120 can be, or include, a depiction of a face including emotionally-aware facial expressions. In accordance with one or more embodiments, image 120 can be generated by emotionally-aware content generator 118 using the facial image identified in a video component of audiovisual input 104 by emotionally-aware content generator 118. By way of a non-limiting example, emotionally-aware content generator 118 can use a facial object detector to identify the facial image. In accordance with one or more embodiments, the identified facial image from audiovisual input 104 can be modified to depict at least one facial expression corresponding to emotion 112 identified by emotion classifier 110.

In accordance with one or more embodiments, digital content generator 122 can generate digital content 124 (as output of emotionally-aware digital content engine 102) using image 120. By way of a non-limiting example, digital content 124 can comprise multiple frames of content, where each frame comprises a video component generated using an image 120 generated by emotionally-aware content generator 118 and an audio component (e.g., the audio used in identifying the emotion 112 used in generating the image 120).

By way of a non-limiting example, audio corresponding to a respective input frame of audiovisual input 104 can be used by speech-to-text converter 106 to generate textual representation 108 for the respective input frame. The textual representation 108 can be used (by emotion classifier 110) to identify emotion 112 and (by phoneme generator 114) to generate phonemic representation 116, both of which can be input (along with the respective input frame's image data) to emotionally-aware content generator 118 to generate image 120. Image 120 corresponding to the respective input frame can be input to digital content generator 122 along with the audio from the respective input frame. Digital content generator 122 can use input to generate an output frame (of digital content 124) comprising a video component generated using the image 120 input and an audio component generating using the audio component from the respective input frame.

In accordance with one or more embodiments, an initial (or first) image 120 corresponding to an initial (or first) input frame of audiovisual input 104 can comprise image data including at least one facial expression for each facial object in the initial input frame. Initial image 120 can comprise data values (e.g., absolute pixel values) for each pixel of initial image 120. A subsequent image 120 generated by emotionally-aware content generator 118 (using the facial image(s) in a video component of a subsequent input frame) can reflect a change in facial expression(s) due to a change in one or both of emotion 112 and phonemic representation 116. The subsequent image 120 can comprise absolute pixel values, delta pixel values (each of which indicating the change in value), or some combination thereof.

Figure 3:
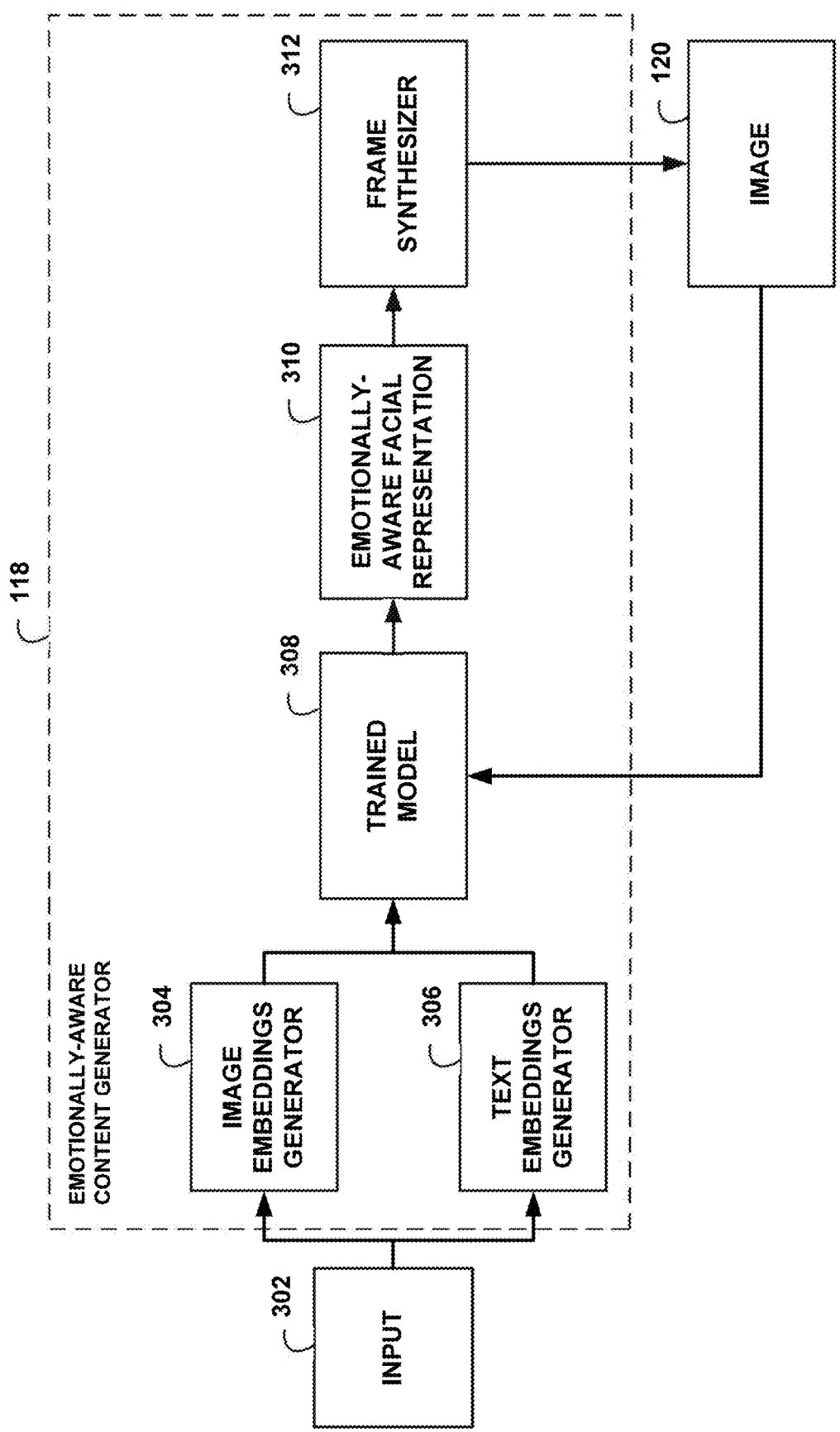
FIG. 3 provides an example illustrating components of emotionally-aware content generator in accordance with one or more embodiments of the present disclosure.

As discussed, in accordance with one or more embodiments, emotionally-aware content generator 118 can use emotion 112 and phonemic representation 116 as input to generate image 120 comprising values (e.g., absolute or delta pixel values) for each pixel of image 120. FIG. 3 provides an example illustrating components of emotionally-aware content generator 118 in accordance with one or more embodiments of the present disclosure.

In example 300 shown in FIG. 3, emotionally-aware content generator 118 comprises image embeddings generator 304, text embeddings generator 306, trained model 308 and frame synthesizer 312. Emotionally-aware content generator 118 uses input 302 to generate image 120. In accordance with one or more embodiments, input 302 comprises emotion 112 and phonemic representation 116. In accordance with at least one such embodiment, input 302 can further comprise image data of an input frame (of audiovisual input 104) from which audio data was extracted and used (by speech-to-text converter 106) to determine textual representation 108. The textual representation 108 can then be used to determine emotion 112 and phonemic representation 116.

In accordance with one or more embodiments, image embeddings generator 304 and text embeddings generator 306 can each comprise one or more neural networks. By way of a non-limiting example, image embeddings generator 304 can comprise an image embedding neural network, such as and without limitation a Stacked Convolutional Neural Network (CNN) Long-Short Term Memory (LTSM) (or Stacked-CNN-LSTM) neural network comprising one or more CNN and LSTM layers and at least one embedding layer configured to generate a set of image embeddings. By way of a further non-limiting example, the text embeddings generator 306 can comprise a text embedding neural network, such as and without limitation an attention-based neural network (ANN) comprising at least one embedding layer configured to generate a set of text embeddings.

In accordance with one or more embodiments, image embeddings generator 304 can be used to provide a set of image embeddings comprising one or more image embeddings. By way of a non-limiting example, the image embeddings can comprise information identifying the set of facial expressions corresponding to the identified emotion. By way of a further non-limiting example, the image embeddings can comprise information identifying changes to one or more portions (or regions of interest) of the facial image (from the video component of an input frame) involved in expressing the identified emotion 112. In accordance with one or more embodiments, an image embedding can be an encoding, such as a vectorization, or vector representation.

Figure 4:
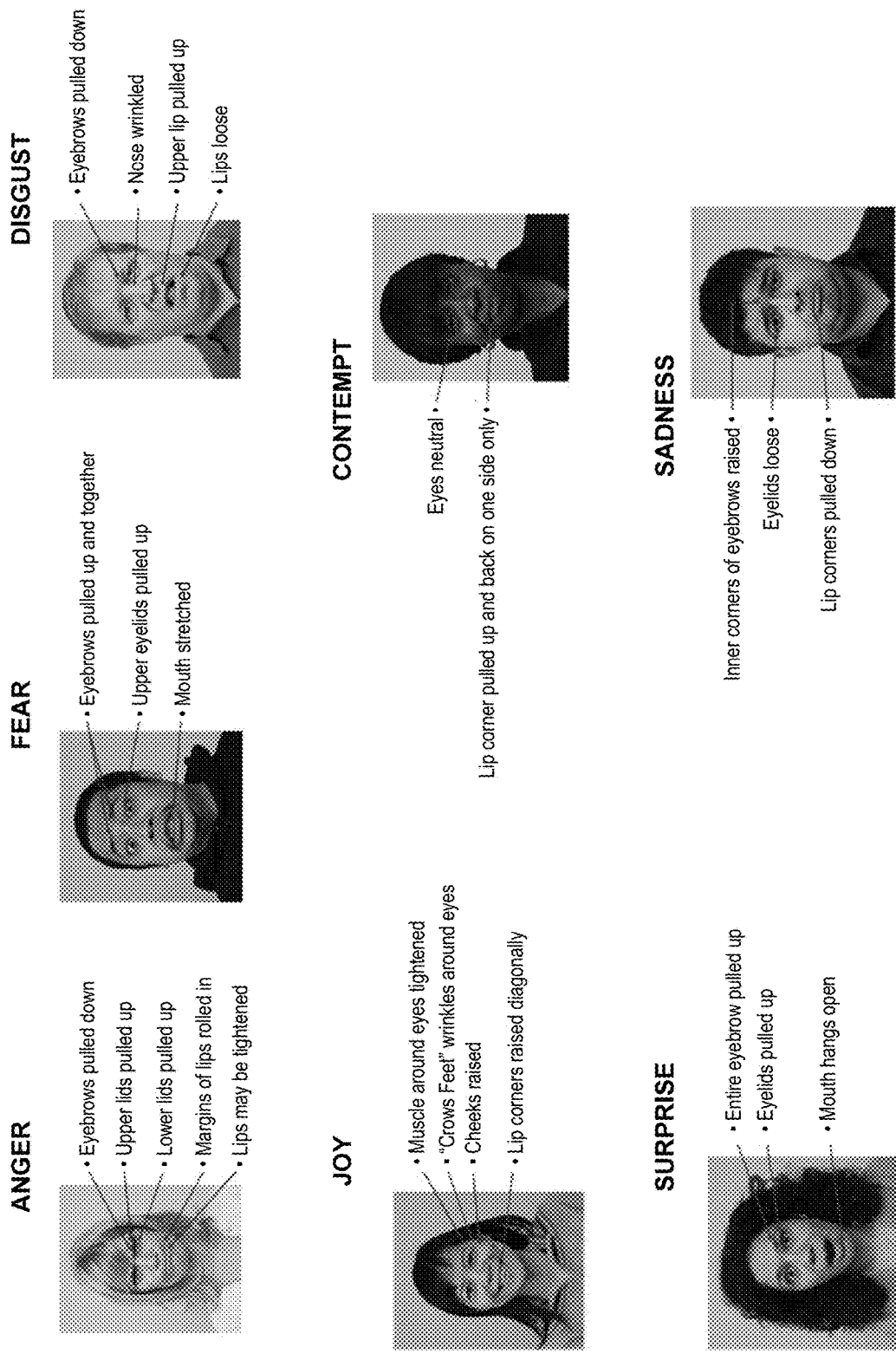
FIG. 4 provides some examples of emotions and corresponding facial expressions for use in accordance with one or more embodiments of the present disclosure.

FIG. 4 provides some examples of emotions and corresponding facial expressions for use in accordance with one or more embodiments of the present disclosure. Example 400 includes faces of a number of individuals expressing an emotion. For example, the example associated with anger shows the individual's facial expression (e.g., position of the eyebrows, lips, etc.) controlled by facial muscles conveying the anger emotion. As can be seen from example 400 each emotion can be conveyed in a nonverbal manner by a corresponding facial expression controlled by muscles of the face. As shown in example 400, expression of an emotion involves changes to one or more facial portions.

Referring again to FIG. 3, in accordance with one or more embodiments, the set of image embeddings comprises a representation of the facial expression(s) corresponding to emotion 112. The set of image embeddings can be generated by one or more inner layers of a neural network (e.g., Stacked-CNN-LSTM) component of image embeddings generator 304. In accordance with one or more embodiments, input 302 can comprise image data corresponding to a face detected in an image (e.g., the video component of an input frame) of audiovisual input 104, which can be used by image embeddings generator 304 to generate the set of image embeddings representative of the emotion 112. In accordance with one or more embodiments, the set of image embeddings represent the facial expression (controlled by various facial muscles) of emotion 112.

In accordance with one or more embodiments, text embeddings generator 306 can be used to provide a set of text embeddings comprising one or more text embeddings. By way of a non-limiting example, each text embedding can correspond to a phoneme in the phonemic representation 116. A text embedding can be an encoding (e.g., vectorization, or vector) representing a portion of text (e.g., a phoneme, word, or the like). A text embedding can reflect the meaning of a phoneme, word, etc. In accordance with one or more embodiments, the set of text embeddings can be generated by one or more inner layers of a neural network (e.g., ANN) component of text embeddings generator 306. In accordance with one or more embodiments, the one or more text embeddings represent the meaning of the phonemic representation 116.

In accordance with one or more embodiments, the image embeddings neural network (e.g., a Stacked-CNN-LSTM) component of image embeddings generator 304 can be trained using a number of training samples comprising a number of image samples (e.g., such as those shown in example 400 of FIG. 4). Each image sample can have a label indicating a corresponding emotion.

In accordance with one or more embodiments, the text embeddings neural network (e.g., an ANN) component of text embeddings generator 306 can be trained using a number of textual samples (e.g., a number of textual representations of sentences). Each training sample can have a label indicating a corresponding emotion.

In accordance with one or more embodiments, the sets of image and text embeddings generated by image embeddings generator 304 and text embeddings generator 306 (respectively) can become input to trained model 308. By way of a non-limiting example, trained model 308 can comprise one or more neural networks. By way of a non-limiting example, trained model 308 can comprise an attention-based encoder-decoder neural network.

The one or more neural networks of the trained model 308 can be trained to generate an emotionally-aware facial representation 310 using the sets of image and text embeddings generated by image embeddings generator 304 and text embeddings generator 306 (respectively). By way of a non-limiting example, the emotionally-aware facial representation 310 can comprise image data (e.g., pixel values) which can be used by frame synthesizer 312 to generate image 120. In accordance with one or more embodiments, emotionally-aware facial representation 310 can be generated by the one or more neural networks of trained model 308 using the sets of image and text embeddings. The emotionally-aware facial representation 310 can represent, or reflect, the emotion 112, e.g., the facial expression corresponding to emotion 112 incorporated into a facial structure (e.g., a facial structure depicted in a video component of an input frame of audiovisual input 104).

In accordance with one or more embodiments, the emotionally-aware facial representation 310 can be input to frame synthesizer 312 to generate image 120. By way of a non-limiting example, emotionally-aware facial representation 310 can comprise image data that can be used by frame synthesizer 312 to generate image 120 having a certain resolution. By way of a further non-limiting example, with a given resolution, frame synthesizer 312 can use emotionally-aware facial representation 310 to render the pixels of image 120.

To further illustrate, with reference to FIGS. 1 and 3, assume that audiovisual input 104 comprises digital content (e.g., animated content) comprising both audio and video content, and the video content depicts a face (e.g., of an individual, character, avatar, etc.) that shows little (if any) indication of the emotion expressed in the character's utterances. With reference to FIG. 1, each frame of the digital content can be input to emotionally-aware digital content engine 102 to generate facial images, each of which reflects a current emotion being expressed in the audio content. Each frame of the digital content can be input to emotionally-aware digital content engine 102.

As discussed herein in connection with one or more embodiments, the audio component of an input frame from the digital content can be used by engine 102 to identify emotion 112 and phonemic representation 116. Emotionally-aware content generator 118 can use emotion 112 and phonemic representation 116 to generate emotionally-aware facial representation 310 of the face depicted in the video component of the input frame that incorporates the facial expression(s) corresponding to emotion 112. Frame synthesizer 312 can use emotionally-aware facial representation 310 to generate image 120, which can be, or include, a depiction of the face (from the video component of the frame) modified to include the facial expression(s) corresponding to emotion 112. This can be done for each frame of the digital content in order to generate digital content 124 comprising emotionally-aware facial images.

In accordance with one or more embodiments, image 120 corresponding to an initial input frame (and each subsequent input frame) that can be used in determining the next image 120. Referring again to FIG. 3, in accordance with one or more embodiments, image 120 (e.g., the initial input frame modified to depict emotion 112) can be fed back to trained model 308 for use in generating an emotionally-aware facial representation 310 for the next (or current) frame from audiovisual input 104. By way of a non-limiting example, trained model 308 can use image 120 along with the image and text embeddings to identify differences (or deltas) between the initial frame's emotionally-aware modifications and the current frame's emotionally-aware modifications in order to generate delta values for including in the current frame's emotionally-aware facial representation 310. In a case that emotion 112 has not changed from the previous (e.g., initial) frame, the modification can be minimal and may be due to other factors (e.g., differences in the phonemic representation 116, image data, etc.).

In accordance with one or more embodiments, the current frame's emotionally-aware facial representation 310 can identify the differences from the previous frame's emotionally-aware facial representation 310, which can be used by frame synthesizer 312 to optimize the current frame's image 120 generation.

Referring again to FIG. 1, in accordance with one or more embodiments, image 120 generated by frame synthesizer 312 can become input to digital content generator 122. Digital content generator 122 can use each image 120 generated using subsequent input frames of audiovisual input 104 to generate digital content 124. By way of a non-limiting example, digital content generator 122 can comprise one or more encoding components, each of which can generate different digital content formats.

Figure 5:
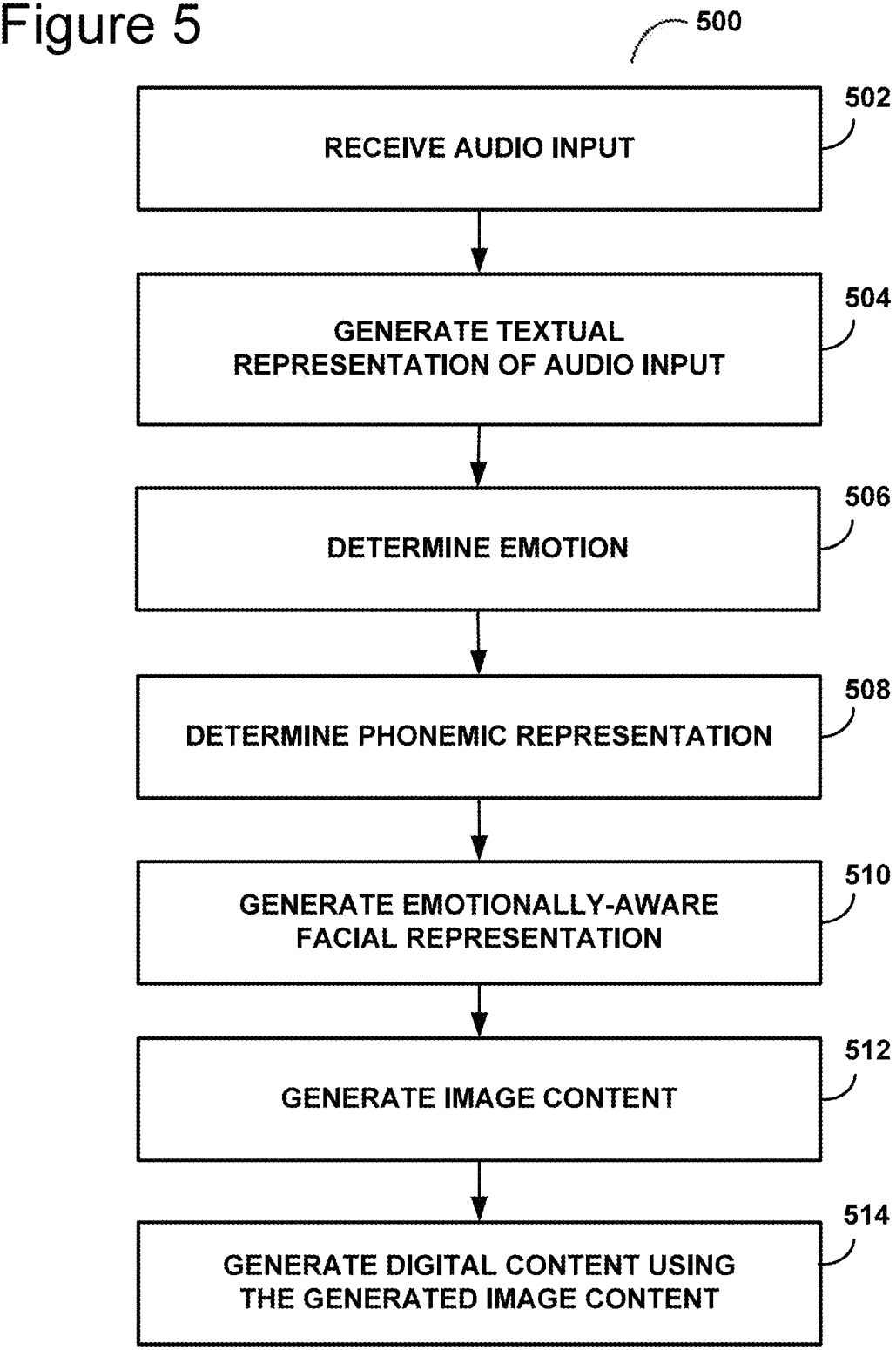
FIG. 5 provides an example of an emotionally-aware digital content generation process flow used in accordance with one or more embodiments of the present disclosure.

FIG. 5 provides an example of an emotionally-aware digital content generation process flow used in accordance with one or more embodiments of the present disclosure. The emotionally-aware digital content generation process flow 500 can be performed by emotionally-aware digital content engine 102 to generate emotionally-aware digital content 124 using audiovisual input 104.

Process flow 500 can be invoked in response to audiovisual input 104. By way of a non-limiting example, audiovisual input 104 can comprise digital content having a number of frames including a facial image (e.g., a face of a character, avatar, animated figure, etc.).

In accordance with one or more embodiments, the emotionally-aware digital content engine 102 can be used to generate one or more images 120, each one can be, or include a depiction of a face including a set of facial expressions corresponding to an identified emotion 112. As discussed, audiovisual input 104 can comprise a number of frames, emotionally-aware digital content engine 102 can be used to generate an emotionally-aware digital content engine 102 for each frame. The images 120 corresponding to the frames of audiovisual input 104 can be used by digital content generator 122 (of emotionally-aware digital content engine 102) to generate emotionally-aware digital content 124.

At step 502 of process flow 500, audio input can be received. By way of a non-limiting example, the audio input can correspond to a frame of digital content. At step 504, a textual representation of the audio input is generated. By way of a non-limiting example, the audio input received at step 502 can be used by speech-to-text converter 106 to generate, or otherwise obtain, textual representation 108.

At step 506, an emotion can be determined. By way of a non-limiting example, the emotion can be determined, or otherwise obtained, using textual representation 108 of the audio input determined at step 504 using the audio input received at step 502. As discussed herein, the emotion (e.g., emotion 112) can be determined by emotion classifier 110 using textual representation 108.

At step 508, a phonemic representation can be determined. By way of a non-limiting example, as discussed in connection with FIG. 1, phoneme generator 114 can use textual representation 108 to generate phonemic representation 116. In accordance with one or more embodiments, the phonemic representation 116 can comprise a number of phonemes corresponding to the textual representation 108.

With reference to FIGS. 1 and 2, textual representation 108 can be generated by speech-to-text converter 106 using the audio input received at step 502. Textual representation 108 can be used by emotion classifier 110 to identify emotion 112. In addition, textual representation 108 can be used by phoneme generator 114 to generate phonemic representation 116.

Referring again to FIG. 5, at step 510, an emotionally-aware facial representation can be generated. By way of a non-limiting example, emotionally-aware content generator 118 can use emotion 112 and phonemic representation 116 alone or in combination with image data corresponding to the audio data received at step 502 to generate, or otherwise obtain, emotionally-aware facial representation 310.

With reference to FIG. 3, emotionally-aware content generator 118 can comprise image embeddings generator 304, text embeddings generator 306, trained model 308 and frame synthesizer 312.

As discussed herein in connection with one or more embodiments, image embeddings generated by image embeddings generator 304 and text embeddings generated by text embeddings generator 306 can be used by trained model 308 to generate emotionally-aware facial representation 310. By way of a non-limiting example, emotionally-aware facial representation 310 can comprise image data which can be used by frame synthesizer 312 to generate image 120, which can be, or include a depiction of a face including a set of facial expressions corresponding to emotion 112. In accordance with one or more embodiments, emotionally-aware facial representation 310 can be generated by the one or more neural networks of trained model 308 using the sets of image and text embeddings. The emotionally-aware facial representation 310 can comprise the facial expression(s) corresponding to emotion 112 incorporated into a facial structure (e.g., a facial structure depicted in a frame of audiovisual input 104).

At step 512, image content can be generated. By way of a non-limiting example, the image content (e.g., comprising one or more of images 120) can be generated by frame synthesizer 312 using the emotionally-aware facial representation 310 generated at step 510. In accordance with one or more embodiments, the image content (e.g., comprising one or more of images 120) generated at step 512 can be, or include, a depiction of a face including a set of facial expressions corresponding to emotion 112.

By way of a further non-limiting example, emotionally-aware facial representation 310 can comprise image data representing, or reflecting, the emotion 112 (e.g., the facial expression(s) corresponding to emotion 112 incorporated into a facial structure). By way of yet another non-limiting example, the facial structure can be determined by trained model 308 using the embeddings received from generators 304, 306 alone or in combination with image data (e.g., from a frame corresponding to the input received at step 502).

At step 514, digital content can be generated using the generated image content. By way of a non-limiting example, the generated image content can comprise one or more images, such as image 120, which can be used by digital content generator 122 to generate digital content 124 (output by emotionally-aware digital content engine 102). In accordance with one or more embodiments, digital content 124 can comprise a number of frames, each frame being generated using an image 120 corresponding to a frame of audiovisual input 104 and audio corresponding to each such frame. By way of a further non-limiting example, the image content (e.g., comprising one or more images, such as image 120) generated at step 512 can be output (e.g., as digital content 124 of emotionally-aware digital content engine 102) at step 514.

Figure 6:
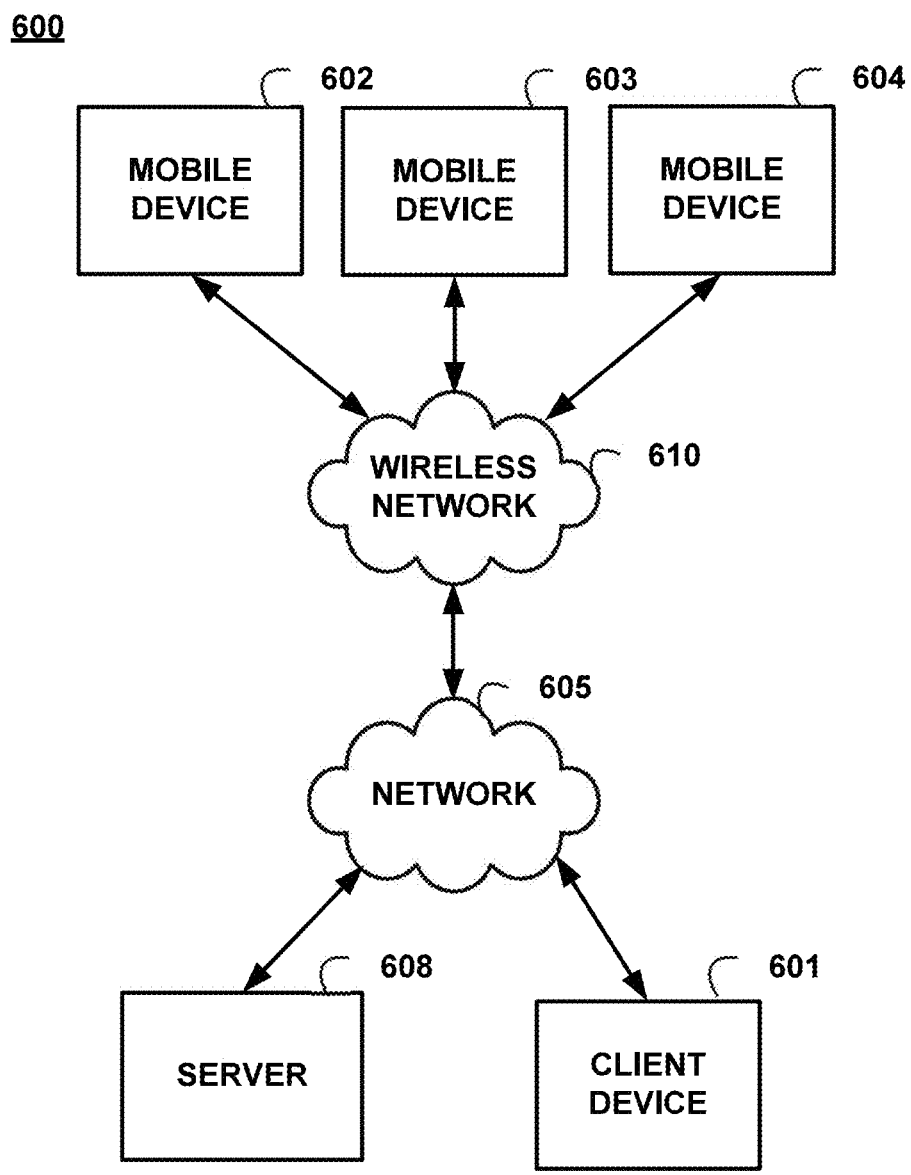
FIG. 6 is a schematic diagram illustrating an example of a network within which the systems and methods disclosed herein could be implemented according to some embodiments of the present disclosure.

In accordance with one or more embodiments, digital content 124 generated by emotionally-aware digital content engine 102 can be served by one or more servers to user computing devices, such as those shown in FIG. 6. FIG. 6 shows components of a general environment in which the systems and methods discussed herein may be practiced. Not all the components may be required to practice the disclosure, and variations in the arrangement and type of the components may be made without departing from the spirit or scope of the disclosure. As shown, system 600 of FIG. 6 includes local area networks ("LANs")/wide area networks ("WANs")-network 605, wireless network 610, mobile devices (client devices) 602-604 and client device 601. FIG. 6 additionally includes a server 608. Examples of web servers include without limitation, application servers, content servers, search servers, advertising servers, etc.

In accordance with one or more embodiments, server 608 can include functionality disclosed herein in connection with one or more embodiments. Server 608 can host one or more web applications, for which user reaction is being monitored. In accordance with one or more embodiments, server 608 can serve digital content 124 (generated by emotionally-aware digital content engine 102) to one or more of mobile devices 602-604 and client device 601. Transmission of digital content 124, by server 608, to one such device can cause it to be output by the device.

One embodiment of mobile devices 602-604 is described in more detail below. Generally, however, mobile devices 602-604 may include virtually any portable computing device capable of receiving and sending a message over a network, such as network 605, wireless network 610, or the like. Mobile devices 602-604 may also be described generally as client devices that are configured to be portable. Thus, mobile devices 602-604 may include virtually any portable computing device capable of connecting to another computing device and receiving information. Such devices include multi-touch and portable devices such as, cellular telephones, smart phones, radio frequency (RF) devices, infrared (IR) devices, Personal Digital Assistants (PDAs), handheld computers, laptop computers, wearable computers, smart watch, tablet computers, phablets, integrated devices combining one or more of the preceding devices, and the like.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 602-604 also may include at least one client application that is configured to receive content from another computing device. The client application may include a capability to provide and receive textual content, graphical content, audio content, and the like. In one embodiment, mobile devices 602-604 may uniquely identify themselves through any of a variety of mechanisms, including a phone number, Mobile Identification Number (MIN), an electronic serial number (ESN), or other mobile device identifier.

In some embodiments, mobile devices 602-604 may also communicate with non-mobile client devices, such as client device 601, or the like. Client device 601 may include virtually any computing device capable of communicating over a network to send and receive information. Thus, client device 601 may also have differing capabilities for displaying navigable views of information.

Client device 601 and mobile devices 601-604 may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 610 is configured to couple mobile devices 602-604 and its components with network 605. Wireless network 610 may include any of a variety of wireless sub-networks that may further overlay stand-alone ad-hoc networks, and the like, to provide an infrastructure-oriented connection for mobile devices 602-604. Such sub-networks may include mesh networks, Wireless LAN (WLAN) networks, cellular networks, and the like.

Network 605 is configured to communicatively couple web server 608 with other computing devices, including, client device 601, and through wireless network 610 to mobile devices 602-604. Network 605 is enabled to employ any form of computer readable media for communicating information from one electronic device to another. Also, network 605 can include the Internet in addition to local area networks (LANs), wide area networks (WANs), direct connections, such as through a universal serial bus (USB) port, other forms of computer-readable media, or any combination thereof.

Within the communications networks utilized or understood to be applicable to the present disclosure, such networks will employ various protocols that are used for communication over the network. Signaling formats or protocols employed may include, for example, TCP/IP, UDP, QUIC (Quick UDP Internet Connection), DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs.

A server, such as server 608, may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like.

In some embodiments, users are able to access services provided by servers, such as web server 608 as well as other servers, such as and without limitation authentication servers, search servers, email servers, social networking services servers, SMS servers, IM servers, MMS servers, exchange servers, photo-sharing services servers, and travel services servers, via the network 605 using their various devices 601-604. In some embodiments, application server can host applications, such as an e-commerce application, a search engine, a content recommendation and/or distribution application, etc.

In some embodiments, web server 608 can store various types of applications and application related information including application data. As is discussed in more detail below, examples of application data include user behavior, application behavior, page visitation sequences, and visit intent and action data. In accordance with some embodiments, web server 608 can host an application, or applications, embodying functionality described herein.

Moreover, although FIG. 6 illustrates web server 608 as single computing devices, respectively, the disclosure is not so limited. For example, one or more functions of web server 608 may be distributed across one or more distinct computing devices. Moreover, in one embodiment, web server 608 may be integrated into a single computing device, without departing from the scope of the present disclosure.

Figure 7:
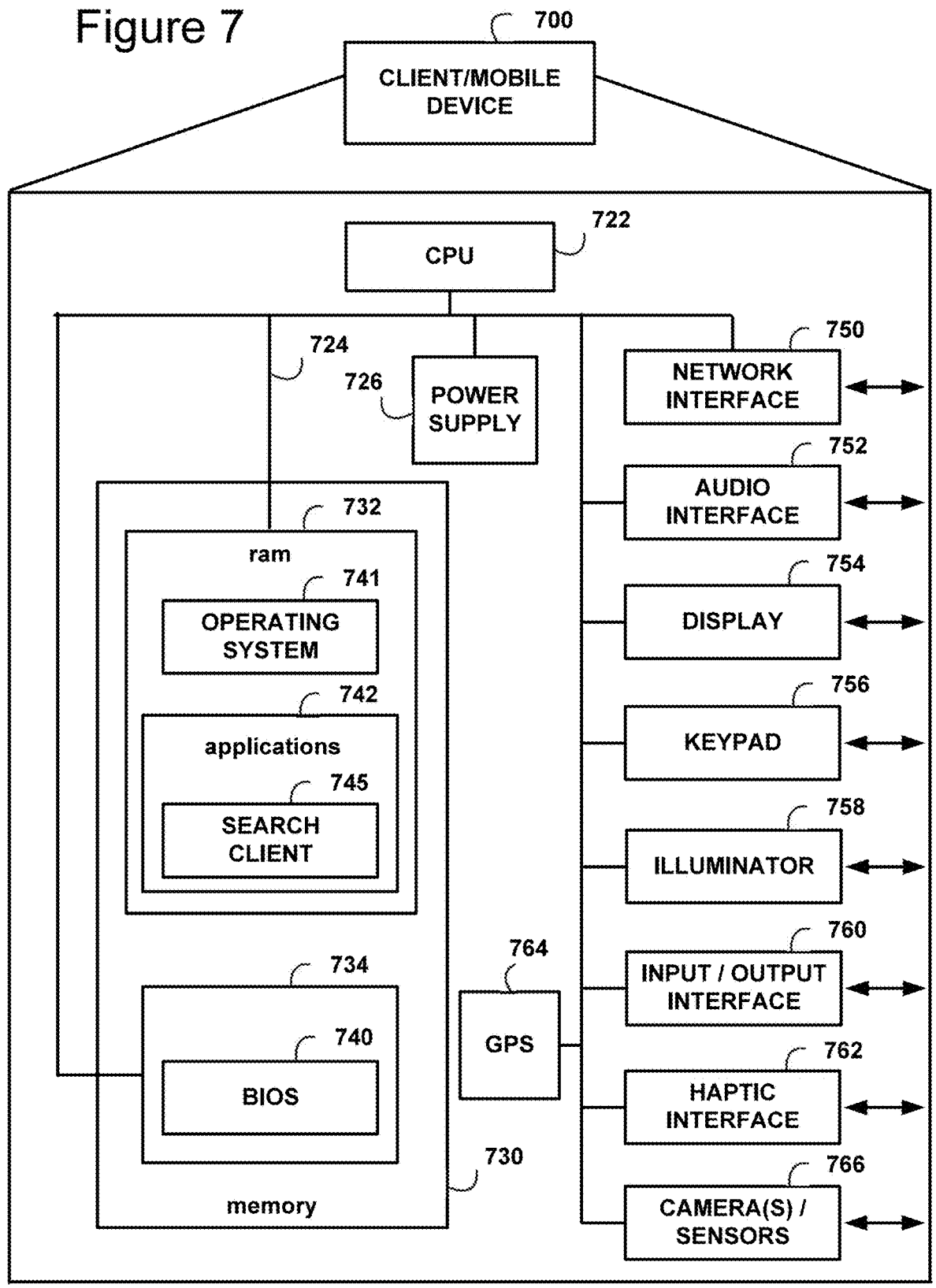
FIG. 7 depicts is a schematic diagram illustrating an example of client device in accordance with some embodiments of the present disclosure.

FIG. 7 is a schematic diagram illustrating an example embodiment of a computing device that may be used within the present disclosure. Device 700 may include many more or less components than those shown in FIG. 7. However, the components shown are sufficient to disclose an illustrative embodiment for implementing the present disclosure. Device 700 may represent, for example, client device 601 and mobile devices 601-604 discussed above in relation to FIG. 6.

As shown in the figure, device 700 includes a processing unit (CPU) 722 in communication with a mass memory 730 via a bus 724. Device 700 also includes a power supply 726, one or more network interfaces 750, an audio interface 752, a display 754, a keypad 756, an illuminator 758, an input/output interface 760, a haptic interface 762, an optional global positioning systems (GPS) transceiver 764 and a camera(s) or other optical, thermal or electromagnetic sensors 766. Device 700 can include one camera/sensor 766, or a plurality of cameras/sensors 766, as understood by those of skill in the art. The positioning of the camera(s)/sensor(s) 766 on device 700 can change per device 700 model, per device 700 capabilities, and the like, or some combination thereof.

Optional GPS transceiver 764 can determine the physical coordinates of device 700 on the surface of the Earth, which typically outputs a location as latitude and longitude values. GPS transceiver 764 can also employ other geo-positioning mechanisms, including, but not limited to, triangulation, assisted GPS (AGPS), E-OTD, CI, SAI, ETA, BSS or the like, or may through other components, provide other information that may be employed to determine a physical location of the device, including for example, a MAC address, Internet Protocol (IP) address, or the like.

Mass memory 730 includes a RAM 732, a ROM 734, and other storage means. Mass memory 730 illustrates another example of computer storage media for storage of information such as computer readable instructions, data structures, program modules or other data. Mass memory 730 stores a basic input/output system ("BIOS") 740 for controlling low-level operation of device 700. The mass memory also stores an operating system 741 for controlling the operation of device 700.

Memory 730 further includes one or more data stores, which can be utilized by device 700 to store, among other things, applications 742 and/or other data. For example, data stores may be employed to store information that describes various capabilities of device 700. The information may then be provided to another device based on any of a variety of events, including being sent as part of a header during a communication, sent upon request, or the like.

Applications 742 may include computer executable instructions which, when executed by device 700, transmit, receive, and/or otherwise process audio, video, images, and enable telecommunication with a server and/or another user of another client device. Other examples of application programs or "apps" in some embodiments include browsers, calendars, contact managers, task managers, transcoders, photo management, database programs, word processing programs, security applications, spreadsheet programs, games, search programs, and so forth. Applications 742 may further include search client 745 that is configured to send, to receive, and/or to otherwise process a search query and/or search result using any known or to be known communication protocols. Although a single search client 745 is illustrated it should be clear that multiple search clients may be employed.

Figure 8:
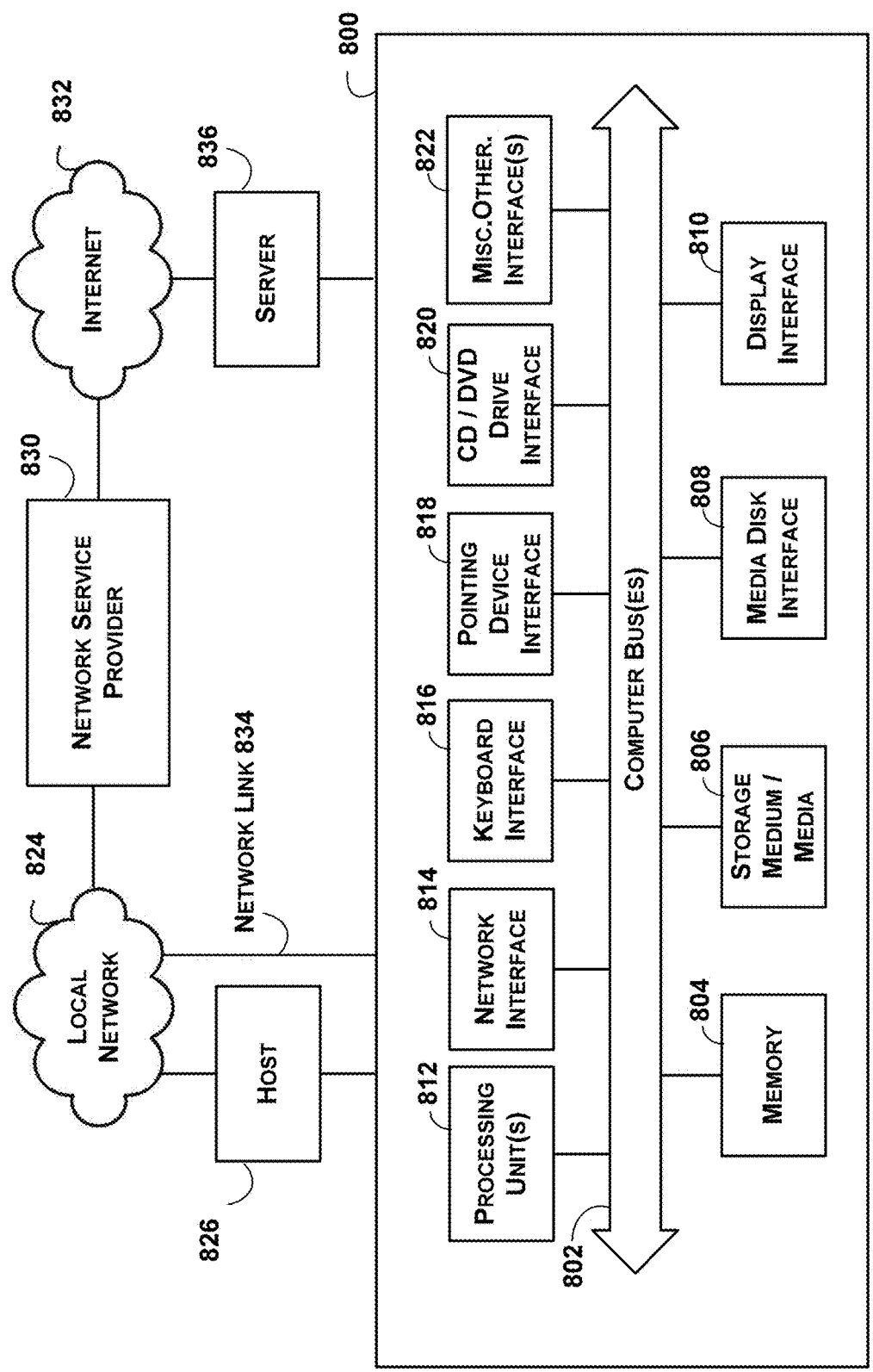
FIG. 8 is a block diagram illustrating the architecture of an exemplary hardware device in accordance with one or more embodiments of the present disclosure.

As shown in FIG. 8, system 800 internal architecture of a computing device(s), computing system, computing platform, user devices, set-top box, smart TV and the like includes one or more processing units, processors, or processing cores, (also referred to herein as CPUs) 812, which interface with at least one computer bus 802. Also interfacing with computer bus 802 are computer-readable medium, or media, 806, media disk interface 808, network interface 814, memory 804, e.g., random access memory (RAM), run-time transient memory, read only memory (ROM), media disk drive interface 820 as an interface for a drive that can read and/or write to media, display interface 810 as interface for a monitor or other display device, keyboard interface 816 as interface for a keyboard, pointing device interface 818 as an interface for a mouse or other pointing device, and miscellaneous other interfaces 822 not shown individually, such as parallel and serial port interfaces and a universal serial bus (USB) interface.

Memory 804 interfaces with computer bus 802 so as to provide information stored in memory 804 to CPU 812 during execution of software programs such as an operating system, application programs, device drivers, and software modules that comprise program code, and/or computer executable process steps, incorporating functionality described herein, e.g., one or more of process flows described herein. CPU 812 first loads computer executable process steps from storage, e.g., memory 804, computer readable storage medium/media 806, removable media drive, and/or other storage device. CPU 812 can then execute the stored process steps in order to execute the loaded computer-executable process steps. Stored data, e.g., data stored by a storage device, can be accessed by CPU 812 during the execution of computer-executable process steps.

Persistent storage, e.g., medium/media 806, can be used to store an operating system and one or more application programs. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 834 typically provides information communication using transmission media through one or more networks to other devices that use or process the information. For example, network link 834 may provide a connection through local network 824 to a host computer 826 or to equipment operated by a Network or Internet Service Provider (ISP) 830. ISP equipment in turn provides data communication services through the public, worldwide packet-switching communication network of networks now commonly referred to as the Internet 832.

A computer called a server 836 connected to the Internet 832 hosts a process that provides a service in response to information received over the Internet 832. For example, server 836 can host a process that provides information representing video data for presentation at a display via display interface 810. It is contemplated that the components of system 800 can be deployed in various configurations within other computer systems, e.g., host and server.

At least some embodiments of the present disclosure are related to the use of computer system 800 for implementing some or all of the techniques described herein. According to one embodiment, those techniques are performed by computer system 800 in response to processing unit 812 executing one or more sequences of one or more processor instructions contained in memory 804. Such instructions, also called computer instructions, software and program code, may be read into memory 804 from another computer-readable medium 806 such as a storage device or network link. Execution of the sequences of instructions contained in memory 804 causes processing unit 812 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 800. Computer system 800 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 812 as it is received, or may be stored in memory 804 or in a storage device or other non-volatile storage for later execution, or both.

The present disclosure has been described with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, the subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in some embodiments" as used herein does not necessarily refer to the same embodiment, and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms such as "and," "or," or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on context.

The present disclosure has been described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure, a non-transitory computer-readable medium (or computer-readable storage medium/media) stores computer data, which data can include computer program code (or computer-executable instructions) that is executable by a computer, in machine-readable form. By way of example, and not limitation, a computer-readable medium may comprise computer-readable storage media, for tangible or fixed storage of data, or communication media for transient interpretation of code-containing signals. Computer-readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer-readable storage media can tangibly encode computer-executable instructions that when executed by a processor associated with a computing device perform functionality disclosed herein in connection with one or more embodiments.

Computer-readable storage media includes, but is not limited to, RAM, ROM, EPROM, EEPROM, flash memory or other solid-state memory technology, CD-ROM, DVD, or other optical storage, cloud storage, magnetic storage devices, or any other physical or material medium which can be used to tangibly store thereon the desired information or data or instructions and which can be accessed by a computer or processor.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

In the preceding specification, various example embodiments have been described with reference to the accompanying drawings. However, it will be evident that various modifications and changes may be made thereto, and additional embodiments may be implemented without departing from the broader scope of the disclosed embodiments as set forth in the claims that follow. The specification and drawings are accordingly to be regarded in an illustrative rather than restrictive sense.

The invention claimed is:

1. A method comprising:
    obtaining, by a computing device, audio input;
    obtaining, by the computing device, a textual representation of the audio input;
    using, by the computing device, the textual representation of the audio input to identify an emotion corresponding to the audio input;
    generating, by the computing device, an emotionally-aware facial representation in accordance with the textual representation and the identified emotion, the generation of the emotionally-aware facial representation comprising:
        determining, by the computing device, a set of image embeddings using a first neural network trained to generate the set of image embeddings using the identified emotion;
        determining, by the computing device, a set of text embeddings using a second neural network trained to generate the set of text embeddings using a phonemic representation of the audio input; and
        using, by the computing device, the set of image embeddings and the set of text embeddings and a third neural network trained to generate the emotionally-aware facial representation in accordance with the textual representation and the identified emotion;
    using, by the computing device, the emotionally-aware facial representation to generate one or more images comprising at least one facial expression corresponding to the identified emotion; and
    providing, by the computing device, at a time corresponding to the obtaining of the audio input and the identification of the emotion, digital content comprising the one or more images, such that a digital representation of a user is modified to visually depict the emotionally-aware facial representation.

2. The method of claim 1, wherein a previously-generated image is used with the set of image embeddings and the set of text embeddings, by the third neural network, to generate the emotionally-aware facial representation.

3. The method of claim 1, wherein the first neural network comprises a Stacked-CNN-LSTM neural network comprising a Convolutional Neural Network and a Long-Short-Term Memory (LSTM) neural network, the second neural network comprises an attention-based neural network and the third neural network comprises an attention-based encoder-decoder neural network.

4. The method of claim 1, further comprising:
    using, by the computing device, the textual representation of the audio input to determine the phonemic representation of the audio input.

5. The method of claim 1, wherein the emotionally-aware facial representation comprises a representation of the at least one facial expression incorporated into a facial structure.

6. The method of claim 5, wherein an image corresponding to the audio input comprises the facial structure into which the at least one facial expression is incorporated.

7. The method of claim 1, wherein using the textual representation of the audio input to identify an emotion corresponding to the audio input further comprises:
using, by the computing device, a trained emotion classifier and the textual representation of the audio input to determine the identified emotion.

8. The method of claim 1, wherein the audio input corresponds to a figure having a face depicted in an image corresponding to the audio input, and the one or more images comprise the face of a character depicted with the at least one facial expression corresponding to the identified emotion.

9. The method of claim 1, wherein the digital content comprises a video comprising a number of frames generated using a number of images, each image comprising at least one facial expression corresponding to a respective emotion.

10. A non-transitory computer-readable storage medium tangibly encoded with computer-executable instructions that when executed by a processor associated with a computing device perform a method comprising:
obtaining audio input;
obtaining a textual representation of the audio input;
using the textual representation of the audio input to identify an emotion corresponding to the audio input;
generating an emotionally-aware facial representation in accordance with the textual representation and the identified emotion, the generation of the emotionally-aware facial representation comprising:
determining, by the computing device, a set of image embeddings using a first neural network trained to generate the set of image embeddings using the identified emotion;
determining, by the computing device, a set of text embeddings using a second neural network trained to generate the set of text embeddings using a phonemic representation of the audio input; and
using, by the computing device, the set of image embeddings and the set of text embeddings and a third neural network trained to generate the emotionally-aware facial representation in accordance with the textual representation and the identified emotion;
using the emotionally-aware facial representation to generate one or more images comprising at least one facial expression corresponding to the identified emotion; and
providing, at a time corresponding to the obtaining of the audio input and the identification of the emotion, digital content comprising the one or more images, such that a digital representation of a user is modified to visually depict the emotionally-aware facial representation.

11. The non-transitory computer-readable storage medium of claim 10, wherein a previously-generated image is used with the set of image embedding and the set of text embeddings, by the third neural network, to generate the emotionally-aware facial representation.

12. The non-transitory computer-readable storage medium of claim 10, wherein the first neural network comprises a Stacked-CNN-LSTM neural network comprising a Convolutional Neural Network and a Long-Short-Term Memory (LSTM) neural network, the second neural network comprises an attention-based neural network and the third neural network comprises an attention-based encoder-decoder neural network.

13. The non-transitory computer-readable storage medium of claim 10, the method further comprising:
using the textual representation of the audio input to determine the phonemic representation of the audio input.

14. The non-transitory computer-readable storage medium of claim 10, wherein the emotionally-aware facial representation comprises a representation of the at least one facial expression incorporated into a facial structure.

15. The non-transitory computer-readable storage medium of claim 14, wherein an image corresponding to the audio input comprises the facial structure into which the at least one facial expression is incorporated.

16. The non-transitory computer-readable storage medium of claim 10, wherein using the textual representation of the audio input to identify an emotion corresponding to the audio input further comprises:
using a trained emotion classifier and the textual representation of the audio input to determine the identified emotion.

17. The non-transitory computer-readable storage medium of claim 10, wherein the audio input corresponds to a figure having a face depicted in an image corresponding to the audio input, and the one or more images comprise the face of a character depicted with the at least one facial expression corresponding to the identified emotion.

18. A computing device comprising:
a processor, configured to:
obtain audio input;
obtain a textual representation of the audio input;
use the textual representation of the audio input to identify an emotion corresponding to the audio input;
generate an emotionally-aware facial representation in accordance with the textual representation and the identified emotion, the generation of the emotionally aware facial representation comprising:
determining, by the computing device, a set of image embeddings using a first neural network trained to generate the set of image embeddings using the identified emotion;
determining, by the computing device, a set of text embeddings using a second neural network trained to generate the set of text embeddings using a phonemic representation of the audio input; and
using, by the computing device, the set of image embeddings and the set of text embeddings and a third neural network trained to generate the emotionally-aware facial representation in accordance with the textual representation and the identified emotion;
use the emotionally-aware facial representation to generate one or more images comprising at least one facial expression corresponding to the identified emotion; and
provide, at a time corresponding to the obtaining of the audio input and the identification of the emotion, digital content comprising the one or more images, such that a digital representation of a user is modified to visually depict the emotionally-aware facial representation.

* * * * *